United States Patent
Pasternak et al.

[11] Patent Number: 5,957,535
[45] Date of Patent: Sep. 28, 1999

[54] SEAT TRACK ASSEMBLY WITH VERTICAL DISLOCATION RESISTANCE BRACKET

[75] Inventors: Christopher George Pasternak, Mishawaka, Ind.; Dale E. Lyons, Cassopolis, Mich.; Ruben Hernandez, Roscoe, Ill.

[73] Assignee: Dura Automotive Systems, Inc., Elkhart, Ind.

[21] Appl. No.: 08/957,729

[22] Filed: Oct. 24, 1997

Related U.S. Application Data

[63] Continuation of application No. 08/965,575, Mar. 19, 1997, Pat. No. 5,826,936, which is a continuation-in-part of application No. 08/821,670, Mar. 29, 1996, abandoned.

[51] Int. Cl.⁶ .................................................... B60N 2/02
[52] U.S. Cl. .......................... 297/337; 248/429; 297/341
[58] Field of Search ........................... 297/216.18, 344.1, 297/341, 337; 248/429, 424

[56] References Cited

U.S. PATENT DOCUMENTS

| | | |
|---|---|---|
| 3,940,182 | 2/1976 | Tamura .................................... 297/341 |
| 4,101,169 | 7/1978 | Muraishi et al. . |
| 4,190,226 | 2/1980 | Letournoux et al. . |
| 4,204,658 | 5/1980 | Gourtois . |
| 4,238,099 | 12/1980 | Hunwicks . |
| 4,378,101 | 3/1983 | Kazaoka et al. . |
| 4,423,904 | 1/1984 | Crawford . |
| 4,440,442 | 4/1984 | Drouillard et al. . |
| 4,449,752 | 5/1984 | Yasumatsu et al. . |
| 4,526,424 | 7/1985 | Korth . |
| 4,569,557 | 2/1986 | Goforth . |
| 4,601,455 | 7/1986 | Lowe et al. . |
| 4,621,867 | 11/1986 | Perring et al. . |
| 4,639,038 | 1/1987 | Heling . |
| 4,648,657 | 3/1987 | Cox et al. . |
| 4,652,052 | 3/1987 | Hessler et al. . |
| 4,671,571 | 6/1987 | Gionet . |
| 4,707,030 | 11/1987 | Harding .................................. 297/341 |
| 4,742,983 | 5/1988 | Nihei ....................................... 248/429 |
| 4,756,503 | 7/1988 | Fujita . |
| 4,781,354 | 11/1988 | Nihei et al. . |
| 4,804,229 | 2/1989 | Nishino . |
| 4,844,542 | 7/1989 | Humer . |
| 4,852,846 | 8/1989 | Weier . |
| 4,880,084 | 11/1989 | Tanaka et al. . |
| 4,881,774 | 11/1989 | Bradley et al. . |
| 4,909,570 | 3/1990 | Matsuhashi . |
| 4,951,966 | 8/1990 | Nihei . |
| 4,969,621 | 11/1990 | Münchow et al. . |
| 4,979,716 | 12/1990 | Holdampf . |
| 5,020,853 | 6/1991 | Babbs . |

(List continued on next page.)

*Primary Examiner*—Peter M. Cuomo
*Assistant Examiner*—Stephen Vu
*Attorney, Agent, or Firm*—Banner & Witcoff, Ltd.

[57] ABSTRACT

A seat track assembly comprises a lower track assembly having a lower track and an upper track assembly slidable over the lower track assembly and having an upper track. An elongate upper bracket and an elongate lower bracket enhance resistance to vertical dislocation. The upper bracket is attached to the upper track and has first and second projections which are positioned on opposite sides of the upper track. The lower bracket is attached to the lower track. The upper bracket can slide free of the lower bracket in a normal operating condition, and the first and second projections of the upper bracket are received by the lower bracket to resist vertical dislocation of the upper track when the upper track assembly is subjected to a vertical dislocation force. The first and second projections are preferably unitary extensions of the upper bracket, and are connected to each other by a connecting segment attached to the upper track. Preferably the upper bracket first and second projections are mirror images of one another so that a vertical dislocation force transmits loading evenly across the brackets. A pair of upper track assemblies can be used with a pair of lower track assemblies, each upper track having an upper bracket as described and each lower track having a corresponding lower bracket.

12 Claims, 4 Drawing Sheets

U.S. PATENT DOCUMENTS

| | | |
|---|---|---|
| 5,052,751 | 10/1991 | Hayakawa et al. . |
| 5,100,092 | 3/1992 | Sovis . |
| 5,104,084 | 4/1992 | Kumagai et al. ........................ 248/430 |
| 5,222,814 | 6/1993 | Boelryk . |
| 5,273,241 | 12/1993 | Droulon . |
| 5,286,076 | 2/1994 | De Voss et al. . |
| 5,318,341 | 6/1994 | Griswold et al. . |
| 5,322,348 | 6/1994 | Johnson et al. ......................... 297/473 |
| 5,352,019 | 10/1994 | Bauer et al. . |
| 5,358,207 | 10/1994 | West . |
| 5,362,132 | 11/1994 | Griswold et al. . |
| 5,383,640 | 1/1995 | Johnson et al. . |
| 5,390,981 | 2/1995 | Griswold . |
| 5,407,165 | 4/1995 | Balocke . |
| 5,531,503 | 7/1996 | Hughes . |
| 5,547,159 | 8/1996 | Treichi et al. . |
| 5,567,013 | 10/1996 | Chang . |
| 5,597,206 | 1/1997 | Ainsworth et al. ................ 297/378.12 |
| 5,605,377 | 2/1997 | Tame . |
| 5,626,392 | 5/1997 | Bauer et al. . |

SEAT TRACK ASSEMBLY WITH VERTICAL DISLOCATION RESISTANCE BRACKET

RELATED APPLICATION

This application is a Continuation of Ser. No. 08/965,575, filed Mar. 19, 1997, now U.S. Pat. No. 5,826, 936 which is a Continuation-in-Part of VEHICLE SEAT ASSEMBLY WITH INERTIA LATCH, Ser. No. 08/821,670, filed on Mar. 29, 1996, now abandoned of Feb. 19, 1998, assigned to the assignee of the present invention.

FIELD OF THE INVENTION

The present invention generally relates to a seat track assembly having enhanced resistance to separation loading, and is particularly useful for all-belts-to-seats (ABTS) seat track assemblies and related seat track assemblies with high strength requirements.

BACKGROUND OF THE INVENTION

Seat track assemblies are commonly used for forward and rearward comfort adjustment of seat assemblies, particularly seat assemblies affixed in motor vehicles. Such seat assemblies normally have a seat base and a seat back, with the seat back pivotably connected to the seat base by a recliner. The seat base is commonly mounted over a pair of upper seat tracks which are in turn slidably mounted on a pair of lower seat tracks. The upper tracks are releasably secured together with corresponding lower tracks by a latch mechanism operable by a release lever, "towel bar" or other well known device. Such seat track assemblies used in motor vehicles are typically attached to a floor pan and optionally to side pillars, so that each lower track and other componentry rigidly attached to each lower track are fixed in position with respect to the motor vehicle. The upper tracks and the componentry mounted to them (that is, the seat cushion, etc.,) are adjustable to a range of fore-and-aft positions.

The upper and lower tracks are typically configured to be interlocked with each other so as to resist vertical separation, often with a reduced friction interface between them for ease of fore-and-aft position adjustment, such that the seat cannot be easily vertically dislocated from the lower tracks. Greater vertical dislocation forces may be experienced, however, than the interlocking tracks can withstand without unacceptable levels of permanent deformation or other damage. This is especially true for seat assemblies in which a seat belt system is mounted directly to the seat assembly, known as "all-belts-to-seat" designs, rather than to the side pillars or to the floor pan. U.S. Pat. No. 5,362,132, issued to Griswold et al, and U.S. Pat. No. 5,322,348 issued to Johnson illustrate the known approach of employing an exterior mounted J-hook fixed to a pair of interlocked seat tracks to secure a seat cushion frame to the lower track sub-assembly against upward dislocation forces. In normal operation, such J-hook is free to slide past an opposed J-hook or other flange fixed to the other one of the interlocking seat tracks during comfort adjustment. In the event of high vertical dislocation forces the seat cushion frame in such prior designs would lift only until the upper J-hook contacts its fixed counterpart. Thus, the J-hook arrangement enables the vehicle seat to withstand vertical dislocation forces beyond the level which can be withstood by the more lightly designed interlocking seat tracks.

While such known J-hook arrangements are useful in withstanding vertical dislocation forces, it has now been discovered that "peeling" can occur in response to high vertical dislocation forces. With a J-hook mounted on only one side of the seat track, the upper track can gradually bend laterally past the lower track in response to a high vertical dislocation force. Such deformation is typically permanent, and can render the seat track assembly inoperable.

In view of the foregoing, it is an object of the present invention to provide a seat track assembly with enhanced resistance to vertical dislocation forces, and in particular a seat track assembly which resists peeling. Additional objects and features of the invention will become apparent from the following disclosure and detailed description of various preferred embodiments.

SUMMARY

In accordance with these and other objects, a seat track assembly for a seat comprises a fixed lower track assembly having first and second lower tracks, laterally spaced from and aligned generally parallel with one another. An upper track assembly operably engages the lower track assembly and comprises a first upper track and a second upper track slidably carried over the first and second lower tracks, respectively. A latch assembly mounted to the upper track assembly releasably engages the lower tracks. The latch assembly is movable from a normal latching position to an unlatching position which allows for comfort adjustment, that is, fore-and-aft position adjustment of the upper track assembly with respect to the lower track assembly. First and second upper brackets are attached to the first and second upper tracks, respectively. Each upper bracket has first and second projections on opposite sides of the upper track. First and second elongate lower brackets are rigidly attached to the first and second lower tracks, respectively. Each lower bracket has left and right flanges. In a normal condition such as comfort adjustment of the upper track assembly of the seat with respect to the lower track assembly, the upper bracket projections slide freely past the lower bracket flanges. In response to a vertical dislocation force, the first and second projections of each upper bracket are received by the left and right flanges of the corresponding lower bracket, respectively, thereby resisting vertical separation of the two track from each other and so resist vertical dislocation of the seat. Deficiencies of prior known devices such as peeling are reduced by having a projection/flange arrangement on both sides of an upper/lower seat track pair, or more preferably both upper/lower seat track pairs, as the upper bracket first and second projections are preferably mirror images of one another so that load is transmitted evenly across the brackets.

From the foregoing disclosure and the following more detailed description of various preferred embodiments it will be apparent to those skilled in the art that the present invention provides a significant advance in the technology and art of seat track assemblies with enhanced vertical dislocation resistance. Particularly significant in this regard is the potential the invention affords for reducing problems associated with uneven load distribution, especially peeling of one upper hook from one lower hook on a seat track assembly, while providing a simple to assemble design for meeting existing and future design parameters and for low cost. Additional features and advantages of various preferred embodiments will be better understood in view of the detailed description provided below.

Figure 1:
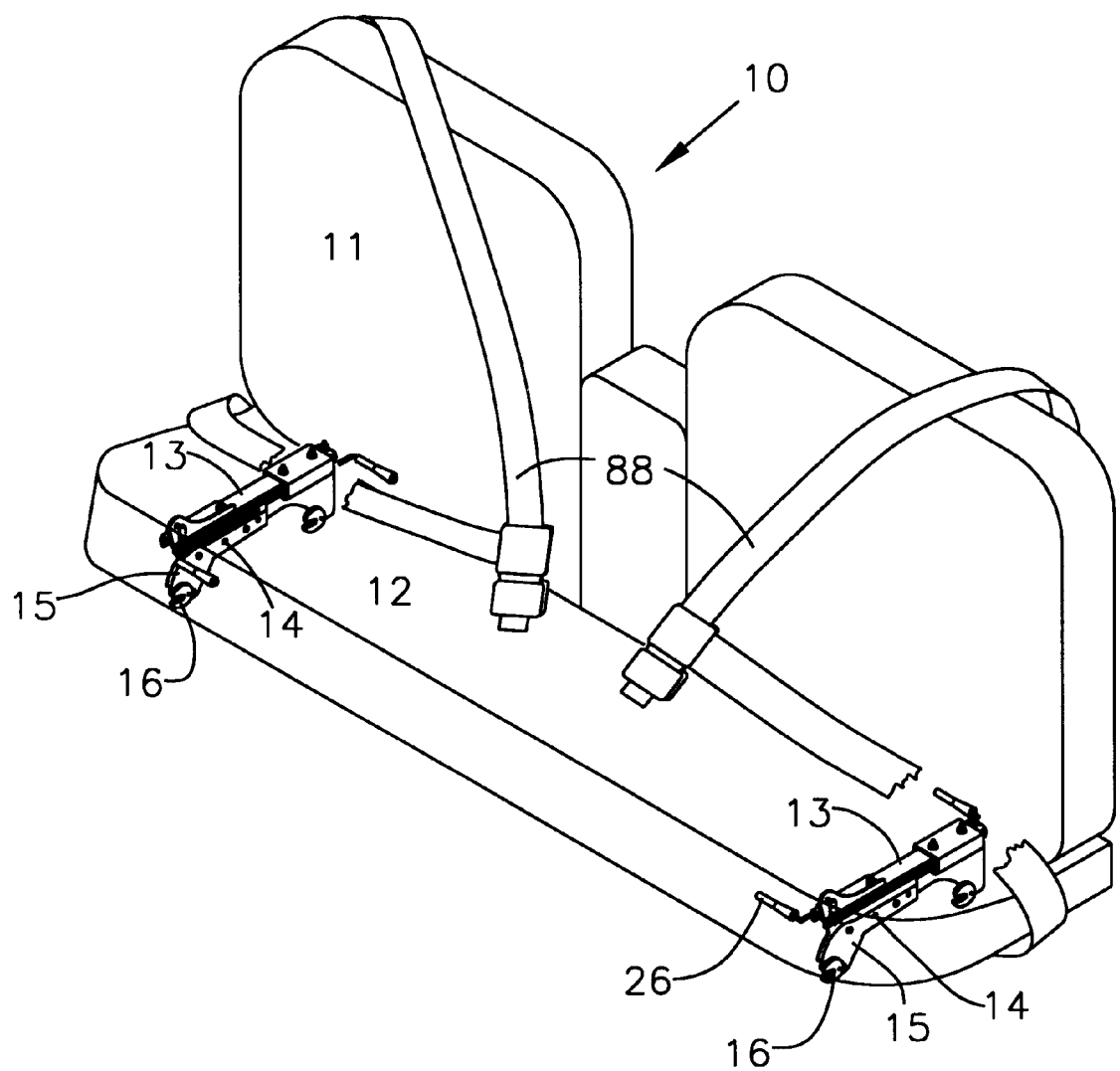
FIG. 1 is a perspective view of a seat comprising a seat track assembly with upper brackets and lower brackets enhancing resistance to vertical dislocation in accordance with a preferred embodiment.
Figure 2:
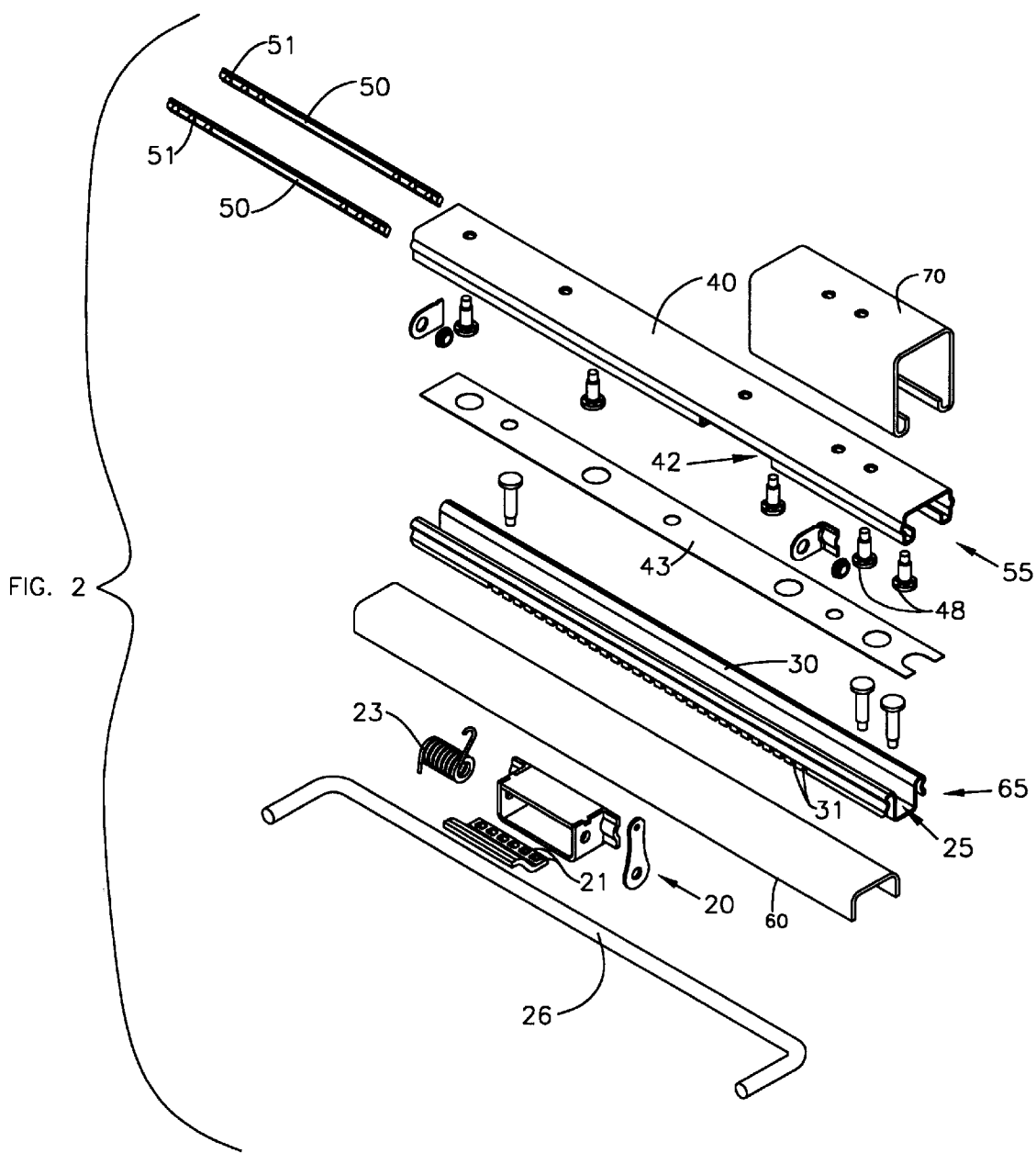
FIG. 2 is an exploded perspective view of the seat track assembly with the upper and lower risers removed for clarity of illustration.
Figure 3:
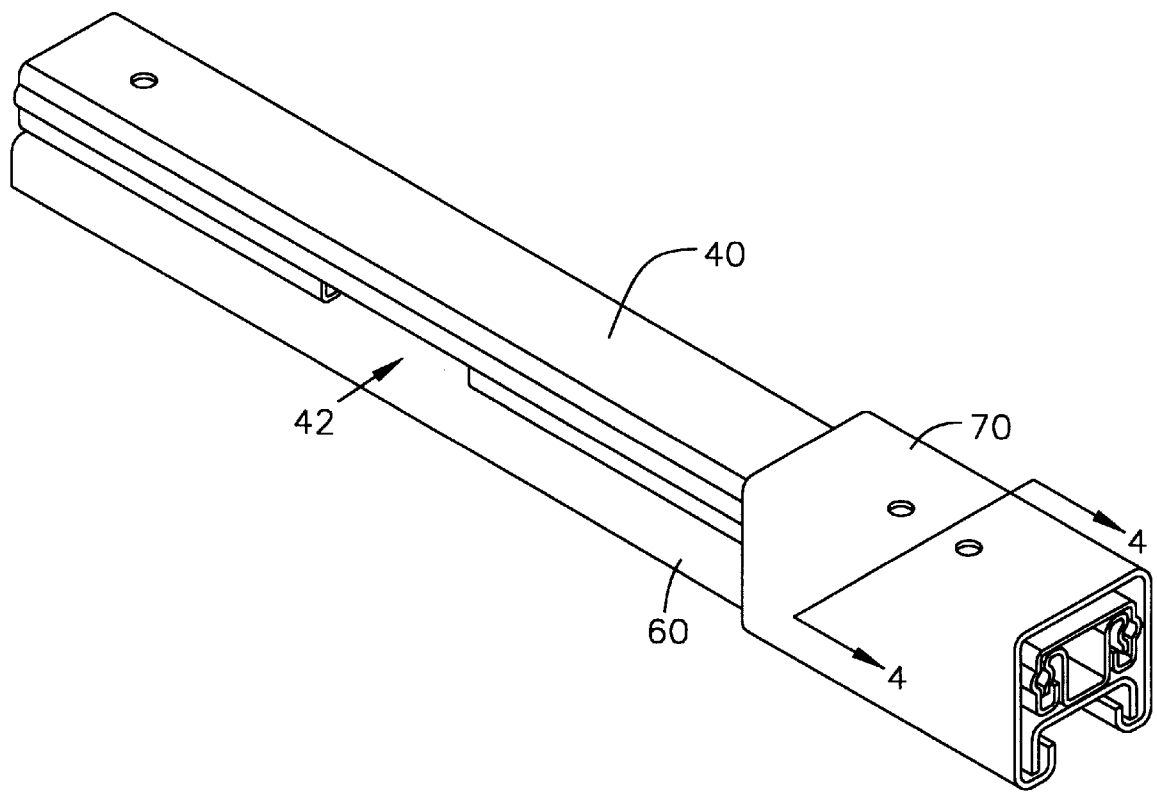
FIG. 3 is an enlarged isolated perspective view of one upper track and one lower track.

It should be understood that the appended drawings are not necessarily to scale, presenting a somewhat simplified representation of various preferred features illustrative of the basic principles of the invention. The specific design features of a seat track with enhanced vertical dislocation resistance as disclosed here, including, for example, the specific dimensions and configurations of the upper and lower brackets, will be determined in part by the particular intended application and use environment. Certain features of the illustrated embodiments have been enlarged or distorted relative to others to facilitate visualization and clear understanding. In particular, thin features may be thickened, for clarity of illustration. All references to direction and position, unless otherwise indicated, refer to the orientation of the seat track assembly illustrated in the drawings. In general, forward and rearward and fore and aft refers to directions normal to the plane of the paper in the side view of FIGS. 4, 5 and 6, and up, down or vertical refers to corresponding up, down and vertical directions in the plane of the paper in FIGS. 4, 5 and 6.

DETAILED DESCRIPTION OF CERTAIN PREFERRED EMBODIMENTS

It will be apparent to those skilled in the art, that is, to those who have knowledge or experience in this area of technology, that many design variations are possible for the seat track assembly disclosed here with externally mounted brackets or wraps for enhanced vertical dislocation resistance. The following detailed discussion of various alternative and preferred features and embodiments will illustrate the general principles of the invention with reference to a seat track assembly used in a motor vehicle seat, particularly for an all-belts-to-seat application where the seat belt is mounted exclusively on the seat, although the principles of the invention will be applicable to seats used in other applications.

Referring now to the drawings, FIGS. 1–5 shows a perspective view of a seat 10 for a motor vehicle comprising a seat back 11 attached to a seat base 12. To raise and align the seat upper and lower risers 13, 14, respectively, are used. A suitable attachment mechanism for securing the seat to a motor vehicle may be used, such as attachment hooks 15 biased by a spring 16 toward a latching position to hold the seat firmly to the motor vehicle. The hooks would attach to a floor pan of a motor vehicle, not shown. A lower track assembly 65 has first and second lower tracks 30 preferably spaced apart and aligned generally parallel with one another. The lower track assembly is preferably rigidly attached to the floor pan of the motor vehicle, either directly or by the lower risers and attachment hooks mentioned above. An upper seat track assembly 55 comprises first and second upper tracks 40, which are slidable over corresponding first and second lower tracks. Typically the upper tracks are slidable in a fore-and-aft direction between a full forward position and a full rearward position. Seat belts 88 may be attached directly to the seat as shown in FIG. 1. One example of a latch 20 is shown in the drawings. The latch releasably secures each upper track to the corresponding lower track. In the preferred embodiment shown in FIGS. 1 and 2, rotation of release lever 26 overcomes the force of a latch spring 23 urging the latch 20 into the latching position, thereby causing latch windows 21 to disengage latch teeth 31 on the lower tracks and allow the upper tracks to be slidably adjusted to an alternative fore-and-aft position. The latch windows 21 access the latch teeth 31 through latch opening 42, shown in FIGS. 2 and 3. After moving the upper tracks to a desired location the lever is released and the spring 23 urges the latch 20 to return to a latching position. This process is commonly referred to as "comfort adjustment". Other latch mechanisms will be readily apparent to those skilled in the art given the benefit of this disclosure.

FIGS. 2–5 focus on one pair of seat tracks; lower track 30 and upper track 40. The left upper and lower seat tracks are preferably substantially mirror images of the right upper and lower seat tracks, and therefore, appropriately illustrative of the seat track assembly as a 20 whole. The lower track 30 has a bottom wall 32 and left and right side walls 33,34 extending from the bottom wall. The left and right side walls cooperate with the bottom wall 32 to define a central channel 25. Left and right downward portions 38,39 extend longitudinally along the upper portion of the left and right side walls 33,34 respectively, and bend outwardly away from the central channel 25.

In certain preferred embodiments the upper track has left and right J-shaped flanges 44, 45, extending from a top wall 41, each of which receives a corresponding downward portion 38, 39 of the lower track forming an interlocking feature of the seat track assembly. In the normal condition the J-shaped flanges are free to slide past the corresponding downward portions 38, 39, preferably without contacting them. In certain preferred embodiments contact surfaces 35 of the lower track 30 act as the principal load bearing surface between the upper track 40 and the lower track 30, cooperating with the other lower track to receive the weight of the seat 10. The contact surfaces 35 are formed by upwardly facing portions of the side walls of the lower track, preferably aligned substantially parallel with the top wall 41. Preferably a low friction interface, such as a glide strip 43, is positioned between the top wall 41 of the upper track and the contact surfaces 35 to facilitate smooth movement during comfort adjustment. Glide strip 43 can be formed of any low friction material, for example, a lubristic plastic such as nylon. For controlling side loading and to provide a firm feel to the assembly lateral stabilization ball bearings 51 positioned by a retainer 50 may be positioned in raceways on either side of the central channel. One-half of each raceway is defined by a curved portion 46 of each flange 38, 39 of the lower track. The other half is formed by a curved portion 47 of each J-shaped flange 44, 45 of the upper track. Other load bearing designs, such as placing the principal load bearing on enlarged ball bearings on either side of the central channel, will be readily apparent to those skilled in the art given the benefit of this disclosure.

Figure 4:
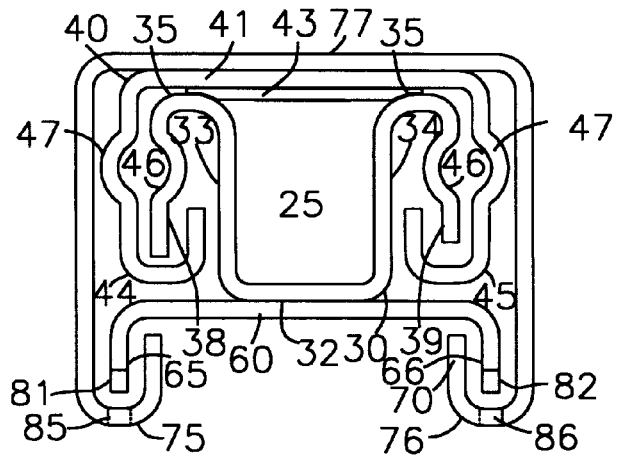
FIG. 4 is an enlarged cross section view taken along line 4—4 in FIG. 3, showing a normal operating condition where an upper bracket is free to slide past a lower bracket.

Preferably the operation of the upper track sliding over the lower track should be smooth to minimize noise and aesthetically unappealing vibrations. This requires proper alignment of the upper track over the lower track, even after being subjected to high vertical dislocation forces. In accordance with a highly advantageous feature upper bracket 70 is rigidly attached to the top wall 41 of the upper track 40. The upper bracket 70 has elongate first and second projections 75, 76 which extend from a connecting segment 77 mounted to the top wall. The first and second projections are unitary with the connecting segment 77, extend down from the connecting segment and are positioned externally of and on opposite sides of the upper track 40. As seen in FIG. 4, the projections 75, 76 form J-hooks which wrap around opposite external sides of the upper track 40 and then extend generally inward toward the central channel 25. Preferably the first and second projections are mirror images of one another so that a vertical separation force is transmitted evenly over the bracket, thereby resisting peeling of the upper track from the lower track. With first and second upper bracket projections each positioned on an opposite side of the upper track and shaped as mirror images of one another, peeling would not occur without much more severe vertical dislocation forces.

Figure 5:
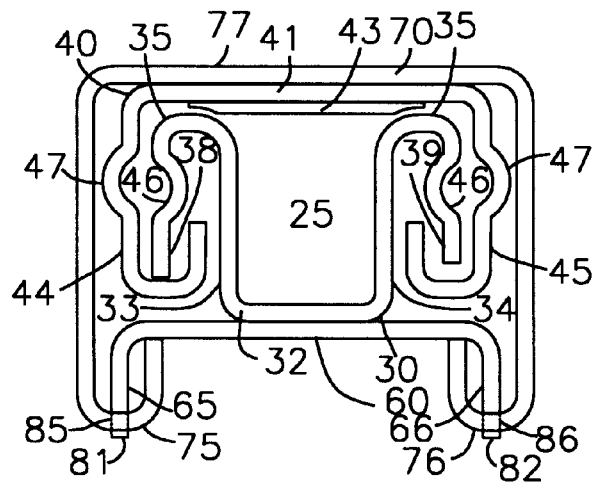
FIG. 5 is an enlarged cross section view taken along line 4—4 in FIG. 3 where in response to a vertical dislocation force the upper bracket moves into contact with the lower bracket.

Lower bracket 60 is mounted to the lower track 30, preferably at the bottom wall 32. Extending from the lower bracket 60 are unitary left and right flanges 65, 66, which optionally can be downwardly extending. The lower bracket may be sandwiched between the lower risers 13, 14, and the lower track 30. The upper bracket 70 is received by the lower bracket 60 so that in a normal operating condition the brackets do not contact one another, and they are free to slide past one another during comfort adjustment. As shown in FIG. 5, in response to a vertical dislocation force the first and second projections 75, 76 will move into contact with the corresponding left and right flanges 65, 66, respectively, resisting dislocation of the upper track from the lower track. Dislocation here means disengagement or undue deformation such as permanent deformation of the seat track sufficient to substantially interfere with normal operation of the seat track assembly. The externally mounted interlocking brackets preferably provide sufficient vertical dislocation resistance to meet all governmental regulations for seat retention applicable to the intended use of the seat track assembly.

Preferably the upper and lower brackets 60, 70 engage one another in response to a vertical separation force before the J-shaped flanges 44, 45 of the upper track engage the downward portions 38, 39 of the lower track flanges. That is the vertical gap between the J-shaped flanges 44,45 of the upper track and the downward portions 38, 39 of the lower track is greater than the space between the upper and lower brackets, 70, 60, respectively.In the embodiment shown in the drawings, the lower bracket 70 runs nearly the length of the lower track, but the upper bracket 60 need only extend sufficiently to be in engagement, preferably full engagement over the entire range of fore-and-aft positions of the upper track. Each bracket 60, 70 may be attached to its corresponding seat track by countersunk screws 48. Alternatively the brackets may be welded to the seat tracks. Other suitable attachment means will be readily apparent to those skilled in the art given the benefit of this disclosure.

As shown in FIGS. 4 and 5, one of the brackets, particularly the lower bracket 60 can have a series of teeth 81 and 82 and the upper bracket has a series of corresponding openings 85, 86. As the upper track attempts to dislocate, the teeth 81, 82 engage the corresponding openings 85, 86 to fix the position of the upper seat track and to resist further fore-and-aft dislocation.

Figure 6:
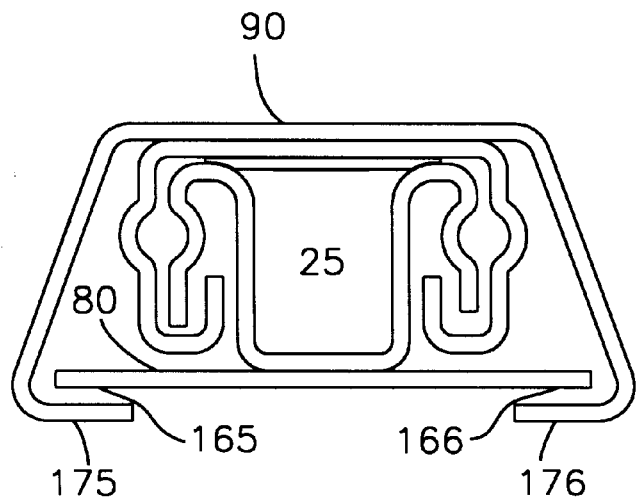
FIG. 6 is an enlarged cross section view of an alternative preferred embodiment of the upper and lower brackets.

FIG. 6 shows an alternative preferred embodiment of interlocking brackets where the upper bracket 90 has first and second projections 175, 176 which do not bend back entirely on themselves, yet still bend generally toward the central channel 25. The lower bracket 80 is seen to be an elongate, generally planar member having planar left and right flanges 165, 166, respectively, which in response to a vertical separation force engage the first and second projections 175, 176 in a manner similar to the previous embodiment described above. Other interlocking configurations will be readily apparent to those skilled in the art given the benefit of this disclosure.

From the foregoing disclosure and detailed description of certain preferred embodiments, it will be apparent that various modifications, additions and other alternative embodiments are possible without departing from the true scope and spirit of the invention. For example, the upper and lower brackets or wraps disclosed herein may also be used with additional mechanisms for resisting vertical dislocation, as well as other position fixing devices. Also those embodiments with lower bracket teeth may, for example, be designed to receive a latch mechanism mounted to the upper track assembly. The embodiments discussed were chosen and described to provide good illustration of the principles of the invention and its practical application, to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat track assembly comprising, in combination:
    a lower track assembly comprising first and second lower tracks laterally spaced from and aligned generally parallel with one another;
    an upper track assembly operably engaging the lower track assembly and comprising a first elongate upper track and a second elongate upper track slidably mounted on the first and second lower track, respectively;
    a first upper bracket and a second upper bracket rigidly attached to the first and second upper track, respectively, each of the upper brackets having first and second projections positioned externally of and on opposite sides of the corresponding upper track, each of the projections extending below a bottom of the corresponding lower track; and
    a first elongate lower bracket and a second elongate lower bracket rigidly attached to the first and second lower track, respectively, each of the lower brackets having elongate left and right flanges, in a normal operating condition the external upper bracket projections slide free of the lower bracket flanges, and the first and second external projections of each of the upper brackets are received by the left and right flanges of each of the lower brackets, respectively, to resist vertical dislocation of the corresponding upper track.

2. The seat track assembly of claim 1 wherein each of the first and second projections are unitary extensions of the corresponding upper bracket.

3. The seat track assembly of claim 1 wherein each of the upper brackets has a connecting segment connecting the first and second projections which is attached to the corresponding upper track.

4. The seat track assembly of claim 1 wherein each of the first upper bracket projections is substantially a mirror image of the second upper bracket projections.

5. The seat track assembly of claim 1 wherein the left lower bracket flanges are is substantially a mirror image of the right lower bracket flanges.

6. The seat track assembly of claim 1 wherein each of the upper bracket projections extend below the corresponding lower tracks.

7. The seat track assembly of claim 1 further comprising a lower riser positioned below each of the lower tracks, and each of the lower brackets are sandwiched between each of the lower risers and the lower tracks.

8. The seat track assembly of claim 1 wherein each of the upper tracks comprises longitudinally extending left and right J-shaped flanges, and each of the lower tracks comprises longitudinally extending left and right flanges, and the left and right J-shaped flanges of each of the upper tracks receive a corresponding downward portion of the left and right flanges, respectively, of the corresponding lower tracks to resist vertical dislocation of each of the upper tracks from each of the lower tracks.

9. The seat track assembly of claim 8 wherein in response to a vertical separation force the upper bracket projections engage the corresponding lower bracket flanges before the J-shaped flanges of the upper tracks engage the downward portions of the corresponding lower track left and right flanges.

10. The seat track assembly of claim 1 wherein each of the lower tracks has latch teeth and each of the upper tracks has a latch having latch windows that engage the latch teeth of the corresponding lower tracks to hold the upper tracks to the corresponding lower tracks in a latching position.

11. A seat track assembly comprising, in combination:

a lower track assembly comprising first and second lower tracks laterally spaced from and aligned generally parallel with one another, an upper track assembly operably engaging the lower track assembly and comprising a first upper track and a second upper track carried over the first and second lower track, respectively, each of the upper tracks forming in cooperation with each of the corresponding lower tracks an elongate central channel;

a first upper bracket and a second upper bracket rigidly attached to the first and second upper track, respectively, each of the upper brackets having first and second projections positioned externally of the corresponding central channels and extending toward each corresponding central channels; and a first elongate lower bracket and a second elongate lower bracket rigidly attached to the first and second lower track, respectively, each of the lower brackets having elongate left and right flanges, such that in a normal operating condition the external upper bracket projections slide free of the lower bracket flanges, and the first and second external projections of each of the upper brackets are received by the left and right flanges of each of the lower brackets, respectively, to resist vertical dislocation of the corresponding upper track.

12. A seat track assembly comprising, in combination:

a lower track assembly comprising first and second lower tracks laterally spaced from and aligned generally parallel with one another;

an upper track assembly operably engaging the lower track assembly and comprising a first elongate upper track and a second elongate upper track slidably mounted on the first and second lower track, respectively;

each of the upper tracks comprising longitudinally extending left and right flanges, and each of the lower tracks comprising longitudinally extending left and right flanges, wherein the left and right flanges of each of the upper tracks receive a corresponding downward portion of the left and right flanges, respectively, of the corresponding lower track to resist vertical dislocation of each of the upper tracks from each of the lower tracks;

a first upper bracket and a second upper bracket rigidly attached to the first and second upper track, respectively, each of the upper brackets having first and second projections positioned externally of and on opposite sides of the corresponding upper track; and a first elongate lower bracket and a second elongate lower bracket rigidly attached to the first and second lower track, respectively, each of the lower brackets having elongate left and right flanges, in a normal operating condition the external upper bracket projections slide free of the lower bracket flanges, and the first and second external projections of each of the upper brackets are received by the left and right flanges of each of the lower brackets, respectively, to resist vertical dislocation of the corresponding upper track.

* * * * *